July 5, 1949.　　　　S. A. TOWNSEND　　　　2,475,531
COTTON PICKING UNIT
Filed Dec. 6, 1945　　　　　　　　　　　　2 Sheets-Sheet 1
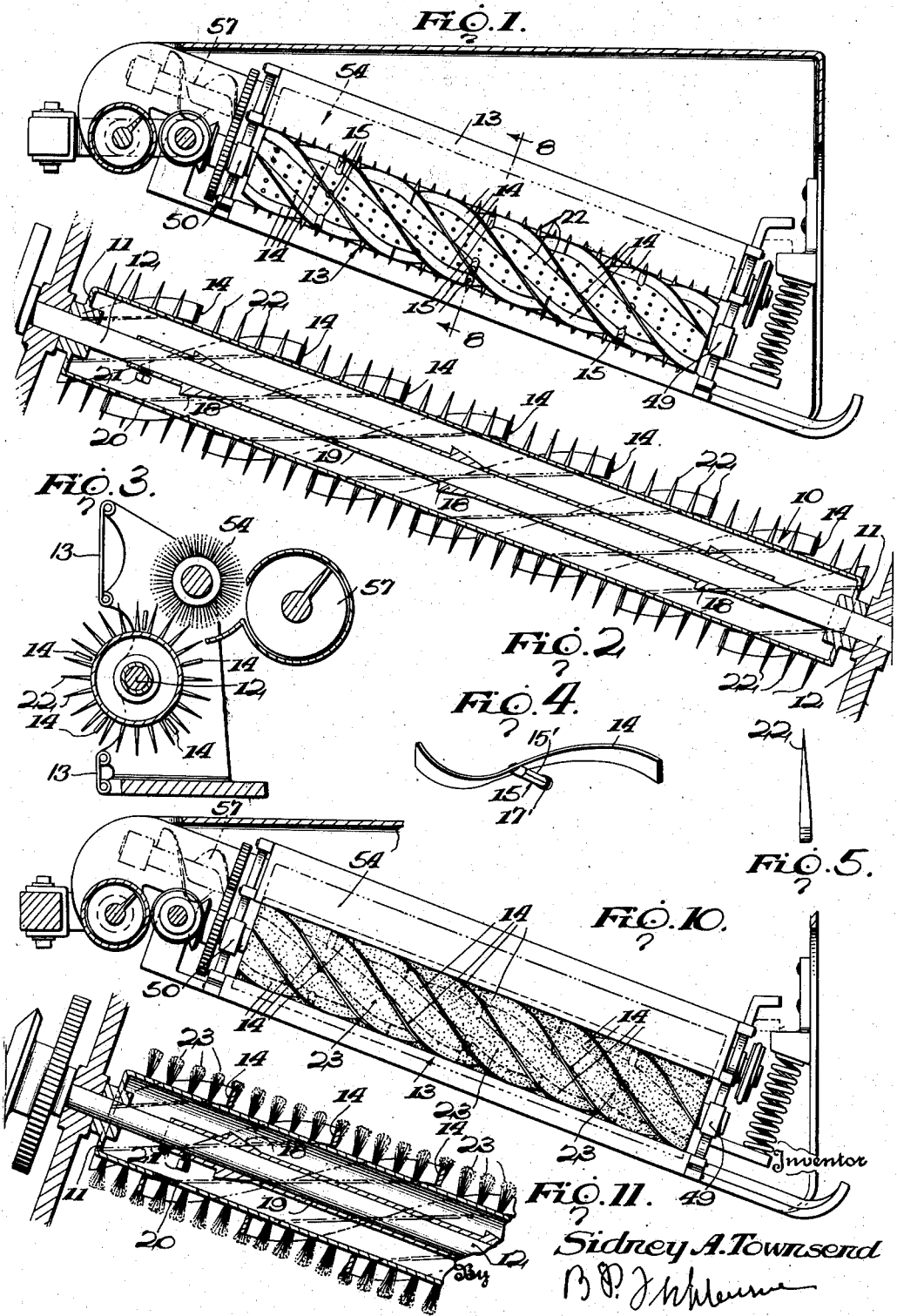
Sidney A. Townsend
Inventor

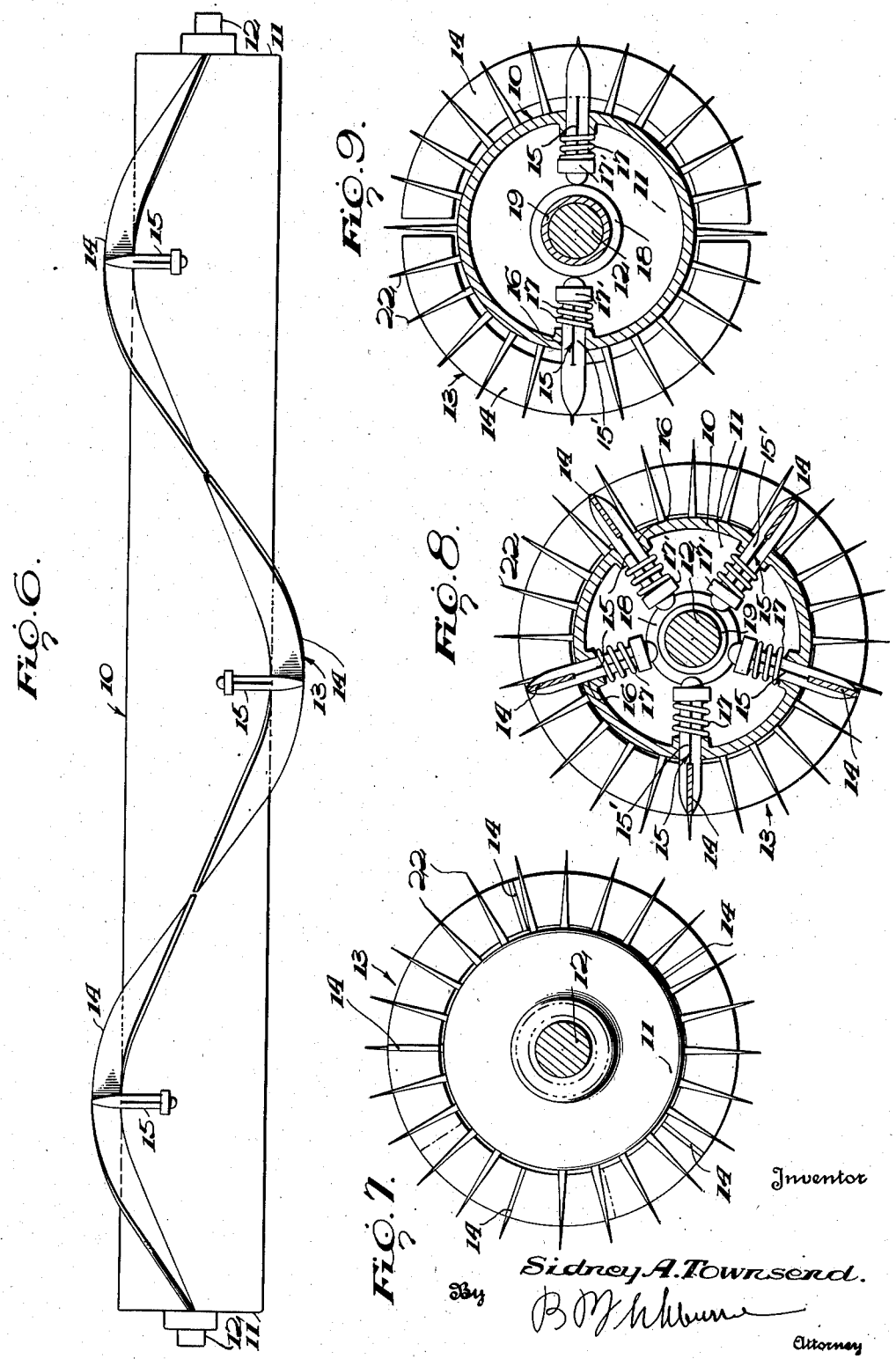

Patented July 5, 1949

2,475,531

UNITED STATES PATENT OFFICE 2,475,531

COTTON-PICKING UNIT

Sidney A. Townsend, Bennettsville, S. C.

Application December 6, 1945, Serial No. 633,243

8 Claims. (Cl. 56—48)

My invention relates to a rotary picking unit for the harvesting of cotton.

An important object of the invention is to provide an improved picking unit which may be substituted for the picking unit shown in my copending application for Cotton picker, filed March 31, 1945, Serial Number 585,936, which has matured into Patent 2,441,130.

A further object of the invention is to provide a rotary picking unit or cylinder which will act upon the cotton plants and swing them rearwardly, during the longitudinal travel of the machine, overcoming or neutralizing the tendency that the plants will have to force or bend the plants downwardly in a forward direction, due to the travel of the machine.

A further object of the invention is to provide the cotton picking unit or cylinder with spiral vane or vanes, which are radially adjustable, to regulate their action upon the cotton plants.

A further object of the invention is to provide a cotton picking unit or cylinder having pins or wires to remove the cotton from the burrs and advance the same to a rotary brush which transfers the cotton to a conveyor.

Other objects and advantages of the invention will be apparent during the course of the following description.

In the accompanying drawings forming a part of this application and in which like numerals are employed to designate like parts throughout the same, Figure 1 is a side elevation of a picking cylinder or unit embodying my invention, Figure 2 is a central vertical longitudinal section through the same, upon an enlarged scale, Figure 3 is a transverse section taken on line 3—3 of Figure 1, Figure 4 is a perspective view of one of the spiral vane segment, Figure 5 is a side elevation of one cotton picking pin, Figure 6 is a side elevation of one complete spiral vane, upon an enlarged scale, Figure 7 is an end elevation of the picking unit, upon an enlarged scale, Figure 8 is a transverse section taken on line 8—8 of Figure 1, upon an enlarged scale, Figure 9 is a transverse section through the drum showing two vane segments in the expanded position, parts being omitted for the purpose of illustration, upon an enlarged scale, Figure 10 is a side elevation of a picking cylinder embodying a modification of the invention, and, Figure 11 is a fragmentary central vertical longitudinal section through the same, upon an enlarged scale.

The picking unit or cylinder embodies a hollow drum or cylinder 10, having ends or heads 11, rigidly mounted upon a shaft 12.

Surrounding the periphery of the cylinder 10 are plant engaging spiral vanes 13. I may employ any suitable number of these spiral vanes, such as from three to five. Five of these vanes have been shown for the purpose of illustration. Each spiral vane preferably extends for 1½ turns around the cylinder. These spiral vanes extend radially with respect to the periphery of the cylinder 10 and project radially outwardly beyond the same. Each spiral vane has a long pitch. Each spiral vane is radially adjustable with respect to the cylinder 10, and to accomplish this, each spiral vane is divided into three segments 14. Each segment extends for 180° with respect to the cylinder. Each segment has a radial arm 15 rigidly secured thereto, at its longitudinal center. Each segment 14 is rigid and the radial arm is rigid and the arm is preferably square in cross section, providing flat faces 15'. The ends of the segments 14 of each spiral vane are arranged in close relation. These ends may abut, as shown, or they may overlap slightly. Each spiral vane provides an outer substantially continuous edge.

The segments 14 are arranged in three longitudinal groups. The radial arms 15 of the segments 14 in each group are arranged in a transverse or circumferential group, and these arms are slidably mounted within openings 16, formed in the cylinder 10. These openings are square so that the arms cannot turn. A compressible coil spring 17 surrounds the inner end of each radial arm 15, and engages a head 17', and serves to shift the radial arm inwardly. The radial arms in each circumferential group are arranged to engage a tapered head or cone 18, rigidly mounted upon a common sleeve 19, longitudinally slidably mounted upon the shaft 12. The cylinder or drum 10 is provided with an opening 20, whereby access may be had to the interior of the cylinder or drum 10 to longitudinally shift the sleeve 19 in either direction, after which the sleeve is locked in adjustment to the shaft 12 by a set screw 21 or the like.

Arranged within the spiral spaces occurring between the spiral vanes 13 are radial picking pins 22, which are stout and rigid and have their outer ends pointed. These pins are rigidly attached to the cylinder or drum 10 and project radially beyond the spiral vanes. Since the spiral vanes are radially adjustable, they regulate the extent that the picking pins 22 will project beyond the spiral vanes.

The picking unit or cylinder herein shown and described is to be substituted for the picking cylinder or unit embodying the circular saws 53 in my said patent. The shaft 12 of the present invention is to be substituted for the shaft 48 and held within the same bearings 49 and 50. The improved picking cylinder or unit of the present invention will have the same inclined position as the picking unit or cylinder embodying the saws 53 of said application. The comb structure of said application embodying the tines 70 will be omitted. All other parts of the apparatus will remain identical with those shown and described in my said application. There will be two of my improved picking units including the cylinders 10 in each picking mechanism, to form a space or passage between them for the cotton plants, corresponding to the passage 38 in my said application. The picking units including the cylinders 10 in each pair will be rotated in opposite directions, their adjacent sides turning upwardly. The spiral vanes 13 are so pitched that they will bend or work the upper portions of the cotton plants rearwardly, during the travel of the machine, thereby overcoming or neutralizing any effect that the machine will have to force or bend the cotton plants forwardly and downwardly. The cotton plants are therefore maintained in the upright position and the picking pins 22 engage with the cotton and strip the same from the burrs. Due to the long pitch of the vanes 13 the stalk of the cotton plant will not pass between the vanes of each cylinder but will slide over their free edges, and the pins 14 project beyond these vanes in order that they may engage the cotton fiber. The cotton remains upon these picking pins until it is brought in proximity to a rotating brush 54, which removes the cotton and transfers the same to a conveyor 57. The brush and conveyor are shown in my said application.

In Figures 10 and 11, I have shown a modification of a picking unit or cylinder. In this modification, the rigid picking pins 22 are dispensed with and wire bristles 23 are employed. These wire bristles are attached to the periphery of the drum 10, are generally radial, are arranged between the vanes 13, and extend radially beyond the vanes. These wire bristles are considerably smaller in diameter than the pins 22 and are somewhat resilient. The second form of the invention is identical with the first form, in all other respects, and the same radial adjustment is provided for the vanes 13.

It is to be understood that the forms of my invention herewith shown and described are to be taken as preferred examples of the same, and that various changes in the shape, size and arrangement of parts may be resorted to without departing from the spirit of my invention or the scope of the subjoined claims.

Having thus described my invention, what I claim is:

1. A picking unit for a cotton picking machine, a cylinder, a spiral vane surrounding the cylinder and projecting radially beyond the same, adjustable means to cause the vane to rotate with the cylinder and to regulate the extent of radial projection of the spiral vane with respect to the cylinder, and cotton picking means mounted upon the periphery of the cylinder.

2. A picking unit for a cotton picking machine, comprising a cylinder, a plurality of spiral vanes surrounding the cylinder and projecting radially beyond the same, each spiral vane including a plurality of sections, means to radially adjust the sections with respect to the cylinder and lock the same in the selected adjusted position, and cotton picking means carried by the periphery of the cylinder.

3. A picking unit for a cotton picking machine, comprising a shaft, a drum mounted upon the shaft, a spiral vane separate from and surrounding the periphery of the drum and formed in separate sections, radial arms secured to the sections and mounted upon the drum and extending inwardly into the drum, a sleeve slidable upon the shaft, tapered members mounted upon the shaft to engage the inner ends of the arms to force them outwardly, means to move the arms inwardly, and cotton picking means mounted upon the periphery of the drum.

4. A picking unit for a cotton picking machine, comprising a cylinder, picking pins mounted upon the cylinder and projecting radially beyond the same, a spiral vane surrounding the cylinder, the pins having a greater radial dimension than the spiral vane, and adjustable means to cause the vane to rotate with the cylinder and to regulate the extent of radial projection of the picking pins beyond the vanes.

5. A picking unit for a cotton picking machine, comprising a cylinder, picking bristles mounted upon the cylinder and projecting radially beyond the same, a spiral vane surrounding the cylinder, the picking bristles having a greater radial dimension than the spiral vane, and adjustable means connecting the cylinder and spiral vane to cause the vane to rotate with the cylinder and to regulate the extent of radial projection of the picking bristles beyond the vane.

6. A picking unit for a cotton picking machine, comprising a cylinder, a support upon which the cylinder is mounted for holding the same inclined in a longitudinal direction with respect to the direction of travel, a plurality of long pitch spiral vanes mounted upon the cylinder for rotation therewith and extending longitudinally thereof, and generally radial cotton picking elements mounted upon the periphery of the cylinder and projecting radially beyond the spiral vanes, the arrangement being such that the pins may engage with the cotton fiber while the main stalk of the plant is sliding over the free edges of the vanes.

7. A picking unit for a cotton picking machine, comprising a cylinder, a support upon which the cylinder is mounted for holding the same inclined in a longitudinal direction with respect to the direction of travel of the support, a plurality of long pitch spiral vanes mounted upon the cylinder for rotation therewith and extending longitudinally of its periphery, and generally radial pins mounted upon the periphery of the cylinder between the vanes and extending for a substantial distance beyond the spiral vanes, the arrangement being such that the pins may engage with the cotton fiber while the main stalk of the plant is sliding over the free edges of the vanes.

8. A picking unit for a cotton picking machine, comprising a cylinder, a support upon which the cylinder is mounted for holding the same inclined in a longitudinal direction with respect to the direction of travel of the support, a plurality of long pitch spiral vanes mounted upon the cylinder for rotation therewith and extending longitudinally of its periphery, generally radial picking elements mounted upon the periphery of the cylinder between the vanes and projecting outwardly beyond the vanes, the arrangement being such that the pins may engage the cotton fiber while the main stalk of the plant is sliding over the edges of the vanes, a guard mounted upon the support and arranged near and above the cylinder to engage with the branches of the plant, and a rotary brush mounted upon the support to remove the cotton fiber from the picking elements.

SIDNEY A. TOWNSEND.

REFERENCES CITED

The following references are of record in the file of this patent:

UNITED STATES PATENTS

| Number | Name | Date |
|---|---|---|
| Re. 16,513 | Streun | Dec. 28, 1926 |
| 1,378,021 | Gipson | May 17, 1921 |
| 1,635,725 | Neil | July 12, 1927 |
| 2,180,594 | Kuhlman | Nov. 21, 1939 |